United States Patent

Karthaeuser

Patent Number: 6,061,615
Date of Patent: May 9, 2000

[54] VEHICLE BODY LEVEL CONTROL SYSTEM

[75] Inventor: Klaus Karthaeuser, Stuttgart, Germany

[73] Assignee: Knorr-Bremse Systeme fur Nutzfahrzeuge GmbH, Munich, Germany

[21] Appl. No.: 08/708,305

[22] Filed: Sep. 4, 1996

[30] Foreign Application Priority Data

Oct. 26, 1995 [DE] Germany ............................ 195 39 887

[51] Int. Cl.[7] ........................................................ F16F 9/50
[52] U.S. Cl. ............................ 701/37; 180/41; 280/5.514
[58] Field of Search ................................ 701/36, 37, 38, 701/39, 40, 5; 280/5.519, 5.514; 180/41

[56] References Cited

U.S. PATENT DOCUMENTS

| | | | |
|---|---|---|---|
| 2,908,508 | 10/1959 | Brunsdon et al. | 280/5.514 |
| 3,970,327 | 7/1976 | Dezelan | 280/683 |
| 4,266,790 | 5/1981 | Uemura et al. | 280/6.1 |
| 4,345,773 | 8/1982 | Brown | 280/6 R |
| 4,349,077 | 9/1982 | Sekiguchi et al. | 180/41 |
| 4,391,452 | 7/1983 | Ohmori | 280/6.1 |
| 4,398,704 | 8/1983 | Buchanan, Jr. et al. | 267/64.21 |
| 4,540,188 | 9/1985 | Meloche et al. | 280/6 R |
| 4,695,074 | 9/1987 | Kobayashi et al. | 280/707 |
| 4,756,548 | 7/1988 | Kaltenthaler et al. | 280/702 |
| 4,821,191 | 4/1989 | Ikemoto et al. | 364/424.1 |
| 4,903,209 | 2/1990 | Kaneko | 364/424.05 |
| 4,971,353 | 11/1990 | Buma et al. | 280/707 |
| 4,974,861 | 12/1990 | Itoh et al. | 280/6.1 |
| 5,043,893 | 8/1991 | Aburaya et al. | 364/424.05 |
| 5,141,245 | 8/1992 | Kamimura et al. | 280/5.514 |

FOREIGN PATENT DOCUMENTS

| | | |
|---|---|---|
| 0 666 190 A1 | 12/1994 | European Pat. Off. . |
| 42 17 650 C1 | 7/1993 | Germany . |
| 4403467 | 8/1995 | Germany . |
| 56-086808 | 7/1981 | Japan . |
| 57-110521 | 7/1982 | Japan . |
| 58-049503 | 8/1983 | Japan . |
| 60-033114 | 2/1985 | Japan . |
| 60-222803 | 11/1985 | Japan . |
| 61-222809 | 10/1986 | Japan . |
| 62-99516 | 9/1987 | Japan . |
| 02133219 | 5/1990 | Japan . |
| 3032913 | 2/1991 | Japan . |
| 07237421 | 9/1995 | Japan . |

OTHER PUBLICATIONS

"Elektronisch Geregelte Luftfederung Fur Nutzfahrzeuge" By Ing. Grad. O. Engfer, Stuttgart.
Preliminary Search Report dated Dec. 8, 1997, FR 9612752.

*Primary Examiner*—William A. Cuchlinski, Jr.
*Assistant Examiner*—Arthur D. Donnelly
*Attorney, Agent, or Firm*—Baker & Daniels

[57] ABSTRACT

A vehicle body level control system which includes three variants for optimization of a level control system during loading and unloading operations. These three variants can be employed independently of one another or in any combination. In a first variant of the invention, the control delay time is extended during loading and unloading operations. In a second variant of the invention, the control dead band is extended during loading and unloading operations. A third variant of the invention consists in performing, in the adjustable state of operation, the control to the presettable level only when the vehicle body level does not vary or varies only very little.

14 Claims, 8 Drawing Sheets

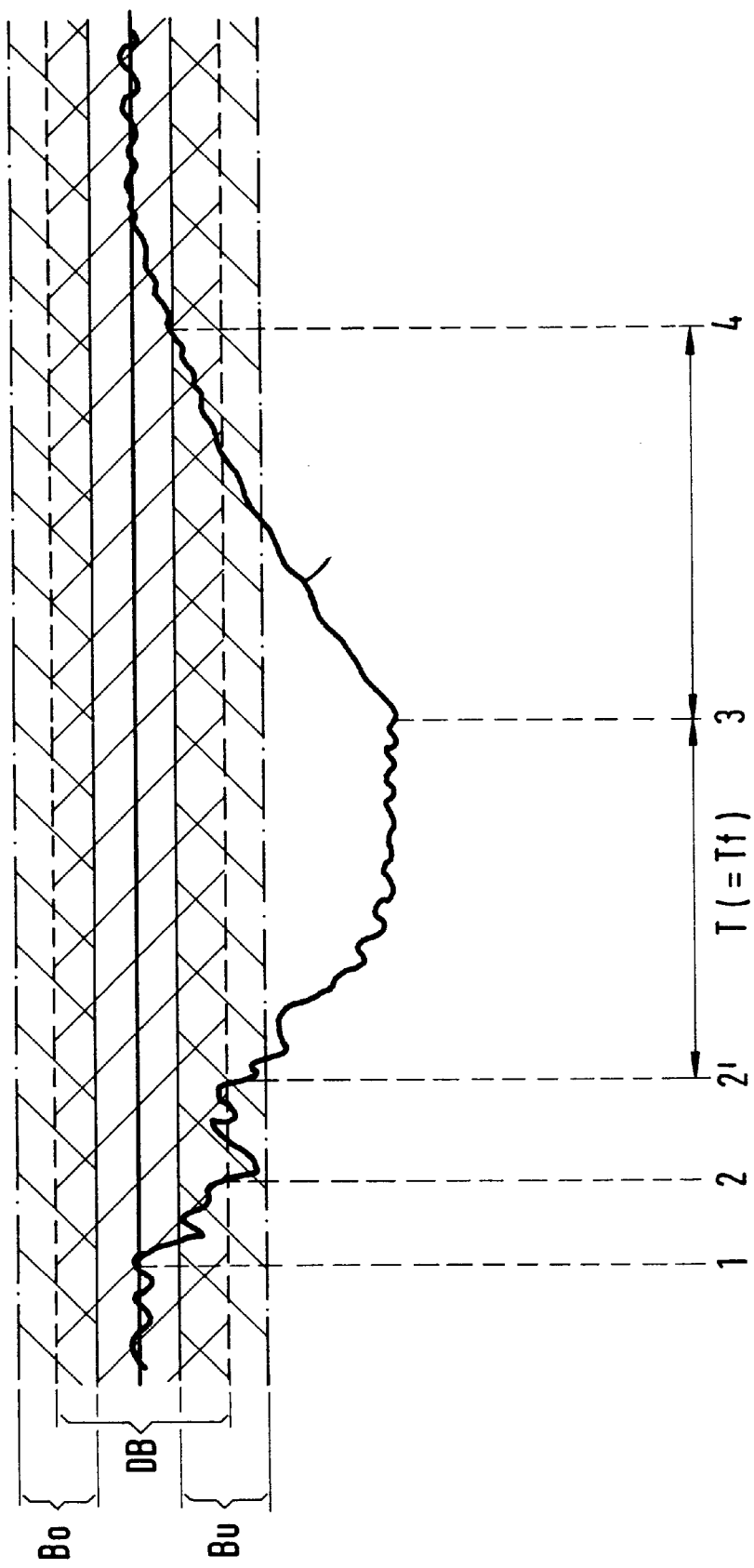

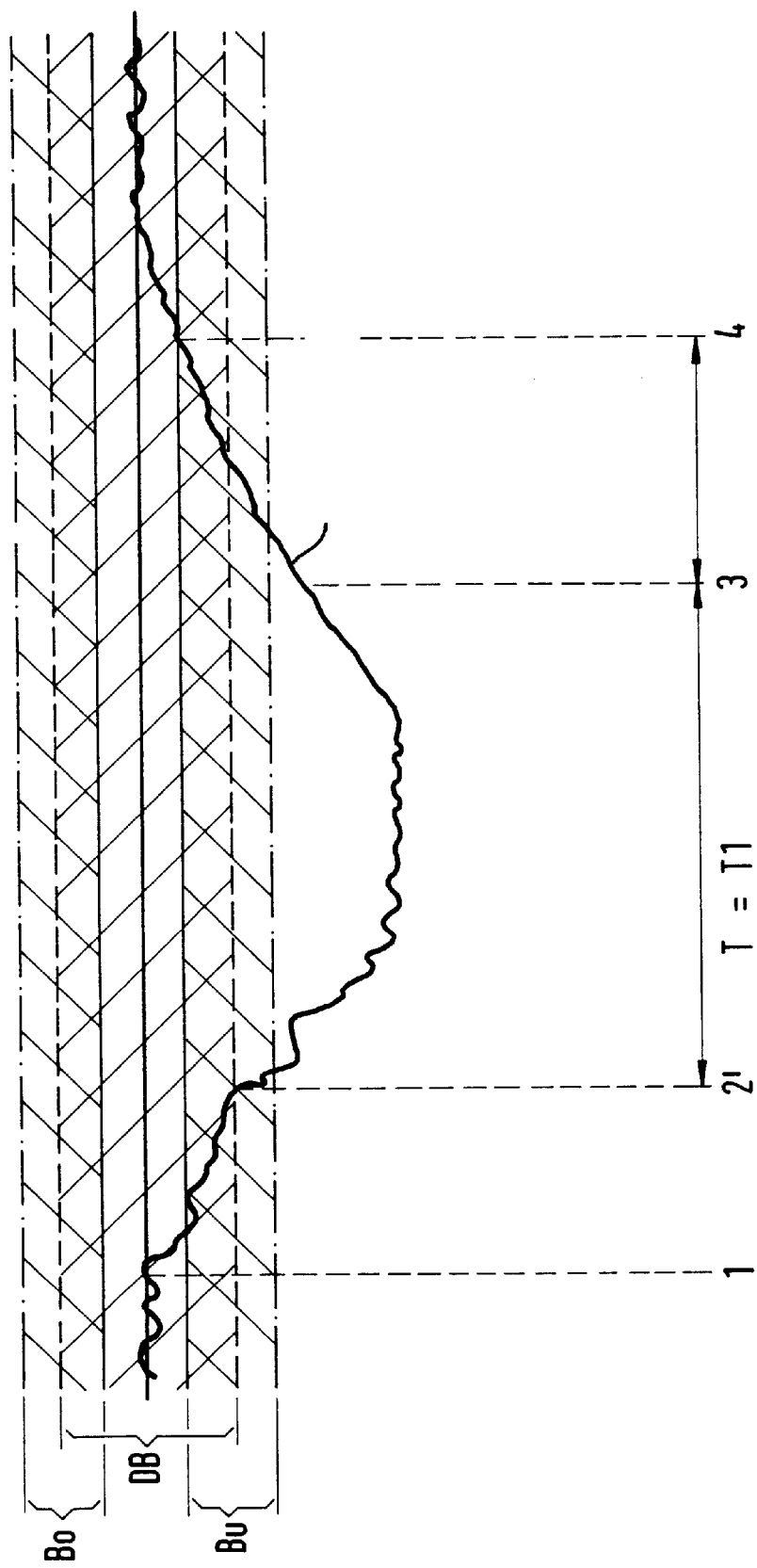

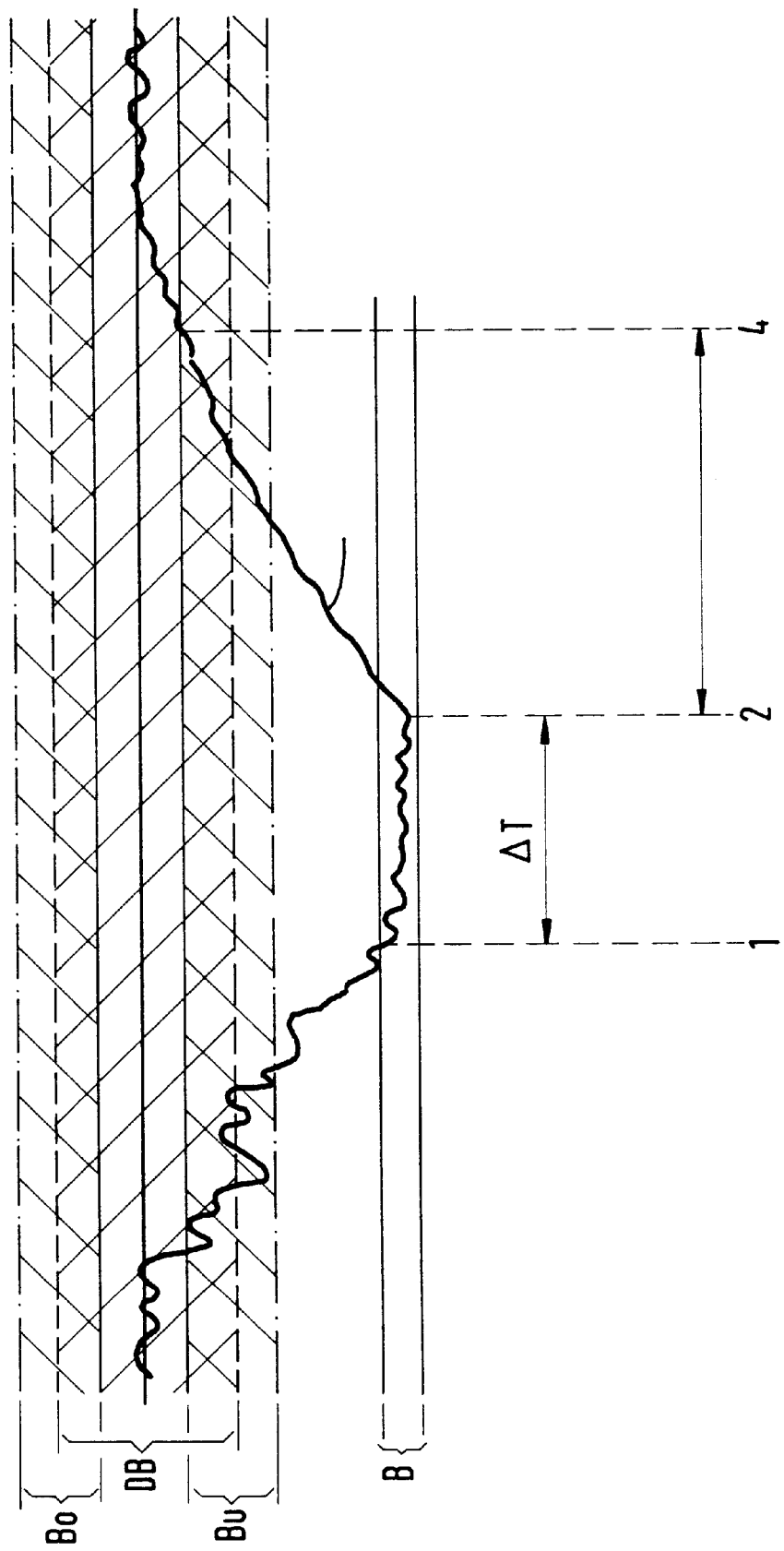

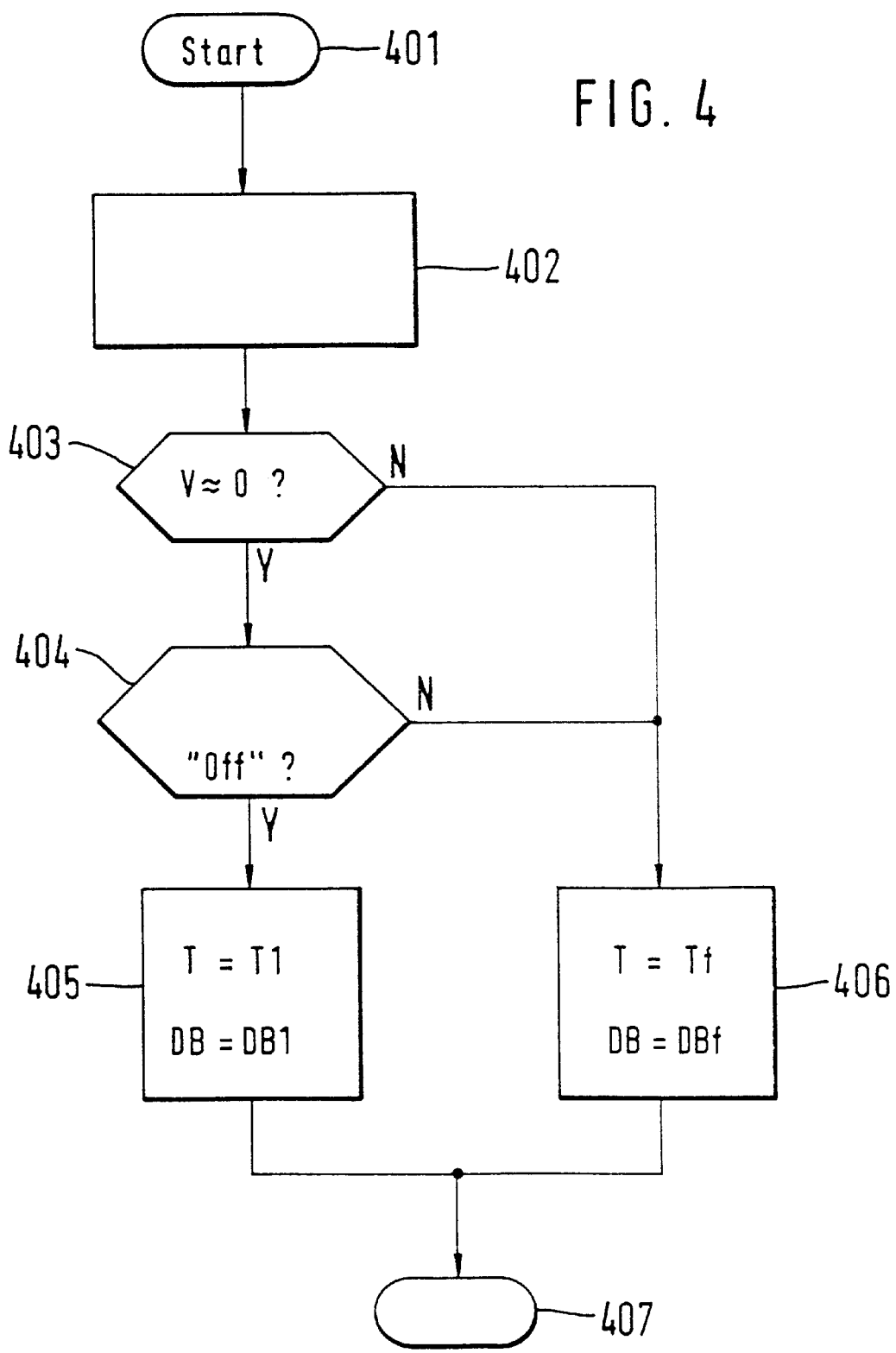

VEHICLE BODY LEVEL CONTROL SYSTEM

BACKGROUND OF THE INVENTION

The inventional system is based on a system for controlling a vehicle body level to a presettable level. Specifically the system according to the present invention controls a vehicle body level to a presettable level with a selectable time delay of the control operations and with at least one state of operation which is adjustable at certain operating conditions of the vehicle in order to minimize the control operations in loading and/or unloading of the vehicle.

Such level control systems are known, e.g., from the article "Elektronisch geregelte Luftfederung für Nutzfahrzeuge" [Electronically Controlled Air Suspension for Trucks], VDI-Berichte No. 687, 1988, pages 161 through 181. This article describes an electronically controlled air suspension which as an adaptive system comprises two system parts, level control and level adjustment. The closed loop is formed by a displacement sensor measuring the distance between axle and body, by an electronic controller for signal processing, by a solenoid valve block for inflating and deflating the air suspension bellows, by the air suspension bellows themselves supporting the load between axle and body, and by the body with the payload and the corresponding force of the weight. Such electronic air suspension serves to keep the vehicle height at a preset level, independently of the state of load. As mentioned above, this takes place by means of displacement sensors arranged on the axles, the signals of which sensors are compared to set values by an electronic controller. Exceeding a preset deviation causes appropriate actuators to be activated by the controller in such a way that a pressure increase or pressure reduction is effected in the air suspension bellows, returning the vehicle height again to the set level. This function is effective both at standstill and travel of the vehicle. Level control assumes a special function in loading at standstill. Remote control provides here the option to gradually approach a level ranging within physical limits and store it as set level. A typical application of this function is the loading operation at a loading dock, where a best possible agreement of dock level and vehicle level simplifies the loading operation considerably. In loading the vehicle, when the vehicle level drops due to the increasing load it is then raised again, and a rise of the vehicle level in unloading is avoided as well. Unloading and loading is problematic when heavy industrial trucks enter the vehicle, such as forklift, which cause a considerable variation in level already by their dead load. The level correction carried out by the air suspension at each load variation results then within a relatively short time in the exhaustion of the compressed air supply, whereby a further level correction is then no longer possible. A remedy is available here merely by starting the vehicle engine and recharging the pneumatic system. In the above article, the driver has the option of selecting on the operating panel of the air suspension system the respective "loading" or "unloading" operation for the vehicle. In loading the vehicle, e.g., only the raising of the body is then settled. Any interim relief goes unallowed for. From the above article it follows also to install, notably in travel operation, a dead band around the set level, in order to preclude that any slight deviation of the actual level from the set level will trigger a control operation. Furthermore, it is described here to provide a delay time between leaving the dead band and the start of the control action.

The objective of the present invention is optimizing the level control in the case of loading and unloading.

SUMMARY OF THE INVENTION

The invention presents three variants for optimization of loading and unloading operations. These three variants may be employed independently of one another or in any combination.

The first variant of the invention is based on a system for vehicle body level control to a presettable level with a selective time delay of the control operations and with at least one state of operation that can be adjusted at certain operating conditions of the vehicle, in order to minimize the control operations in loading and/or unloading the vehicle. The core of this variant is that the time delay is prolonged in the adjustable state of operation. That is, a variation of the vehicle level is settled only upon expiration of a relatively long time delay. When configuring this time delay to the effect that it ranges approximately in the order of a loading or unloading cycle (in the range of about 10 to 60 seconds), many unnecessary control operations (settling level variations brought about merely by the dead load of the industrial truck) are avoided by this variant of the invention.

A favorable embodiment of the first variant provides for making the determination of the current prolongation of the time delay in the operating state (loading and/or unloading of the vehicle) dependent on at least the level variation of the preceding control cycle. This configuration of the first variant has the advantage that a self-leaning adaptation of the time delay is being arrived at. This embodiment makes allowance for the loading and unloading operations that have a very different time behavior. When it is found that level variations with a different mathematical sign (body ascending or descending) take place in successive control cycles, it may be concluded that these level variations are not caused by a vehicle loading or unloading, but instead are initiated by the dead load of the industrial truck. The time delay is in such a case extended. Contrarily, when finding that the vehicle level variations occur in one mathematical sign direction, the time delay is shortened or kept constant.

The second variant of the invention is based on a system for vehicle body level control to a presettable level with a control dead band around the presettable level and with at least one operating state adjustable at certain operating conditions of the vehicle, in order to minimize the control operations in loading and/or unloading the vehicle. The core of this second variant is that the dead band of control is extended in the adjustable operating state. This measure, too, allows minimizing favorably the number of control cycles in vehicle loading and unloading. To that end, the width of the control dead band around the presettable level is adapted to the average weight of a relevant industrial truck.

A third variant of the invention again is based on a system for vehicle body level control with at least one operating state adjustable at certain operating conditions of the vehicle, in order to minimize the control operations in loading and/or unloading the vehicle. The core of this variant is that the control to the presettable level is actuated only when the vehicle body level does not change or varies only very slightly. According to this variant, a vehicle level control does not take place until a "standstill" of the level sensor signal occurs, that is, no control actions are carried out as the loading surface is being entered and at motions on the loading surface which result therefrom. Arrived at thereby in favorable manner is a system where the level variations caused by the dead load of the industrial truck remain unallowed for. A combination with the aforementioned second variant is provided for particularly in the case of the third variant. For one, a level control takes place only when the vehicle level does not vary or varies only slightly or when a predefined tolerance limit (control dead band) is being exceeded. Possible thereby are also control operations during an individual loading or unloading operation (industrial truck present on the body), when the level variation exceeds a certain threshold. Here, allowance is made for an action in which the industrial truck carries a very heavy mass onto the body, whereby a marked displacement of the body relative to the loading dock can occur. If in this case the body level were left unchanged, difficulties could occur once the industrial truck is to exit from the motor vehicle, back again to the loading dock.

The decisive advantage of all three variants resides in the distinctly reduced air consumption, which expresses itself in an eminently improved availability of the overall system. Compressor operation, and thus running the engine, becomes a much more seldom necessity, which results in a reduced environmental burden and noise annoyance. Here, it should be kept in mind, in particular, that loading operations often take place in warehouses, yards or also in residential areas.

A favorable embodiment of all three systems provides for allowing the adjustable operating state selection only with the vehicle at standstill. Note must be taken, specifically, that the changed control mode cannot be put in operation or its operation maintained while the vehicle is traveling.

A provision for that purpose may be that the operating conditions of the vehicle are determined depending on the position of the vehicle switch. The idea in this context, in particular, is that the operating condition of the vehicle is determined by the fact that the vehicle switch is in a position in which the vehicle engine is at standstill and/or the operating condition of the vehicle is determined by the fact that the vehicle switch is not in a position in which the vehicle engine can be started or in which the vehicle engine is, or may be, in operation.

Also provided for control of the vehicle body level are actuators for raising or lowering the vehicle level, sensors for sensing the actual vehicle level, and processing means for forming activation signals to activate the actuators.

BRIEF DESCRIPTION OF THE DRAWINGS

FIG. 1 and 2 show schematically the operating mode of a prior level control system. FIG. 3a, 3b, and 3c show the time progression of an actual level as compared to a set level, while FIG. 4, 5 and 6 are flow diagrams of the inventional variants.

DESCRIPTION OF THE PREFERRED EMBODIMENT

The variants according to the invention are described in detail with the aid of the exemplary embodiments described hereafter.

Figure 1:
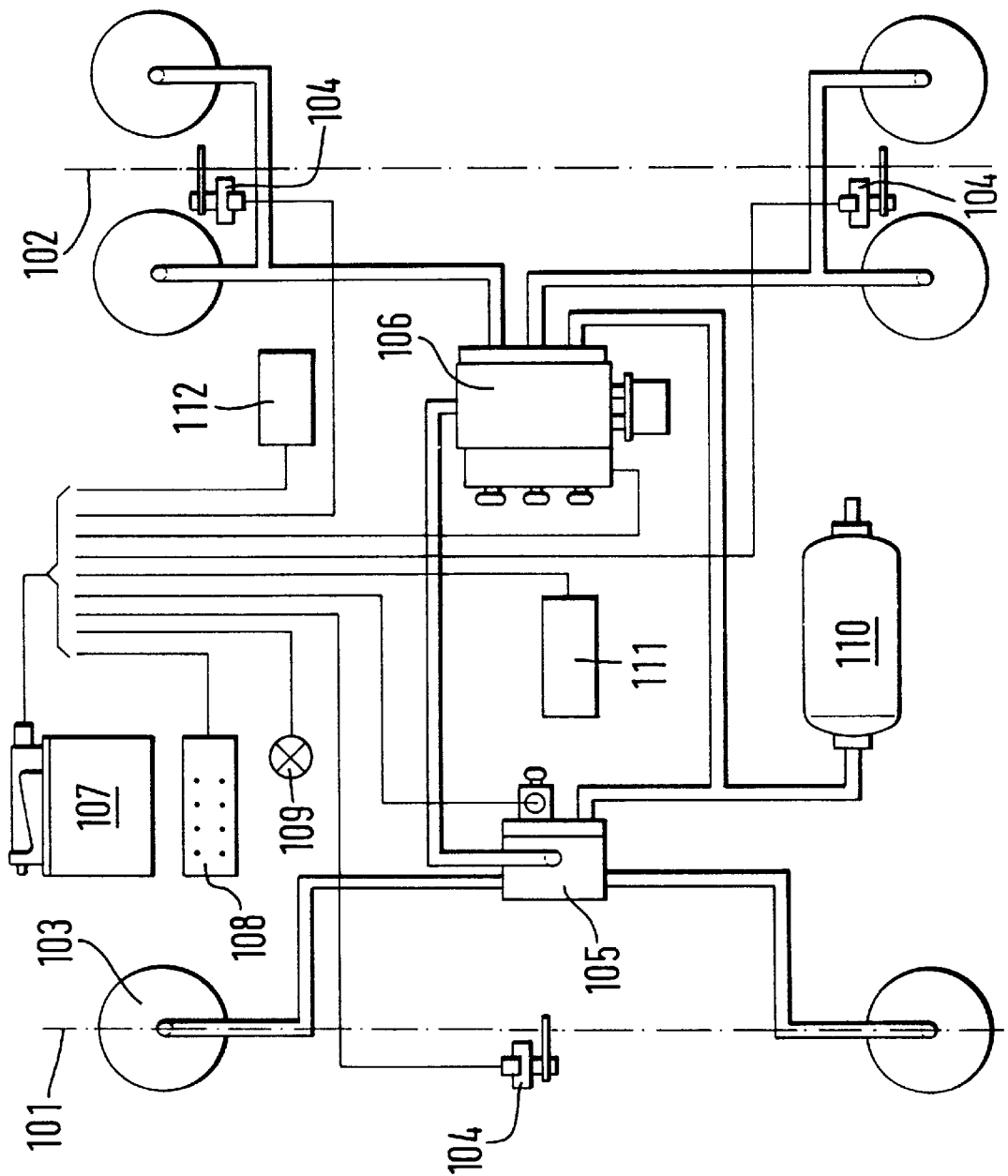

FIG. 1 shows schematically an electronically controlled air suspension for a bus or truck. References 101 and 102 are the front and rear axle, respectively. Transducers 104 are arranged between the vehicle body (not illustrated) and the axles. Transducers 104 transmit to the controller for the electronic level control current values representing the relative distance between axle and vehicle body. A solenoid valve is marked 105, while 106 references a solenoid valve block. Activation of the solenoid valves by the controller 107 allows a specific feeding of air to the air suspension bellows 103 or a venting of air from said air suspension bellows 103. Moreover, 108 references a remote control, 109 a warning lamp. The overall system is supplied with air by the storage tank 110. The controller 107 receives the signals of a vehicle linear speed signal generator 111 and of a vehicle switch 112.

The mode of operation of the level control system with the vehicle traveling is sketched with the aid of FIG. 2. The deviations from the set level are not settled immediately, but only after expiration of a certain delay time T. Furthermore, to avoid unnecessary in-travel control operations, a control dead band DB is provided around the set level. The control is initiated after a certain delay time T only when the current actual value departs from the control dead band DB. In the example illustrated in FIG. 2, the actual level leaves the control dead band at the time 2. Before expiration of the delay time, however, the actual level is again within the control dead band, whereupon no control is carried out. The control continues to be performed after expiration of the delay time T at the time 3, only when the actual level leaves the control dead band again at the time 2', until the lower cutout-limiting band Bu is being left at the time 4. Regarding the cutout limits Bo and Bu that are dependent on rate of control, reference is made to the initially mentioned article. The control cutout depending on rate of control, shown in FIG. 2 at the time 4, is not an object of the present invention.

FIG. 3a, in conjunction with FIG. 4, shows the first variant of the system according to the invention. Following the start 401, step 402 reads the vehicle linear velocity V (FIG. 1, sensor 111) and the position of vehicle switch 112. Step 403 queries whether the vehicle linear velocity V has a value of zero or is within a range around zero. If this is not the case, this means that the vehicle is not at standstill, whereupon step 406 sets for the delay time T shown in FIG. 2 the fixed value Tf, and sets the fixed value DBf for the control dead band DB. But with the vehicle at standstill, step 404 verifies whether the vehicle switch is in the "off" position. In this vehicle switch position, the vehicle cannot move on. If the vehicle switch is not in the "off" position, step 406 described above is carried out. However, if the position of the vehicle switch signals a possible loading or unloading operation, the delay time can in step 405 be set to the fixed value T1. Said fixed value T1 is greater than the value Tf, which is selected while the vehicle is traveling. In the framework of the second variant of the invention, furthermore, the control dead band DB can be set to the value DB1; said value DB1 is greater than the value DBf selected while the vehicle is traveling.

A provision may be that the sequence illustrated in FIG. 4 is carried out either during the entire operation of the vehicle (traveling and loading/unloading operation). Specifically, however, the idea is that the sequence will be started only in response to an input to the controller (or by a corresponding input "loading/unloading" in the remote control 108).

Figure 3B:
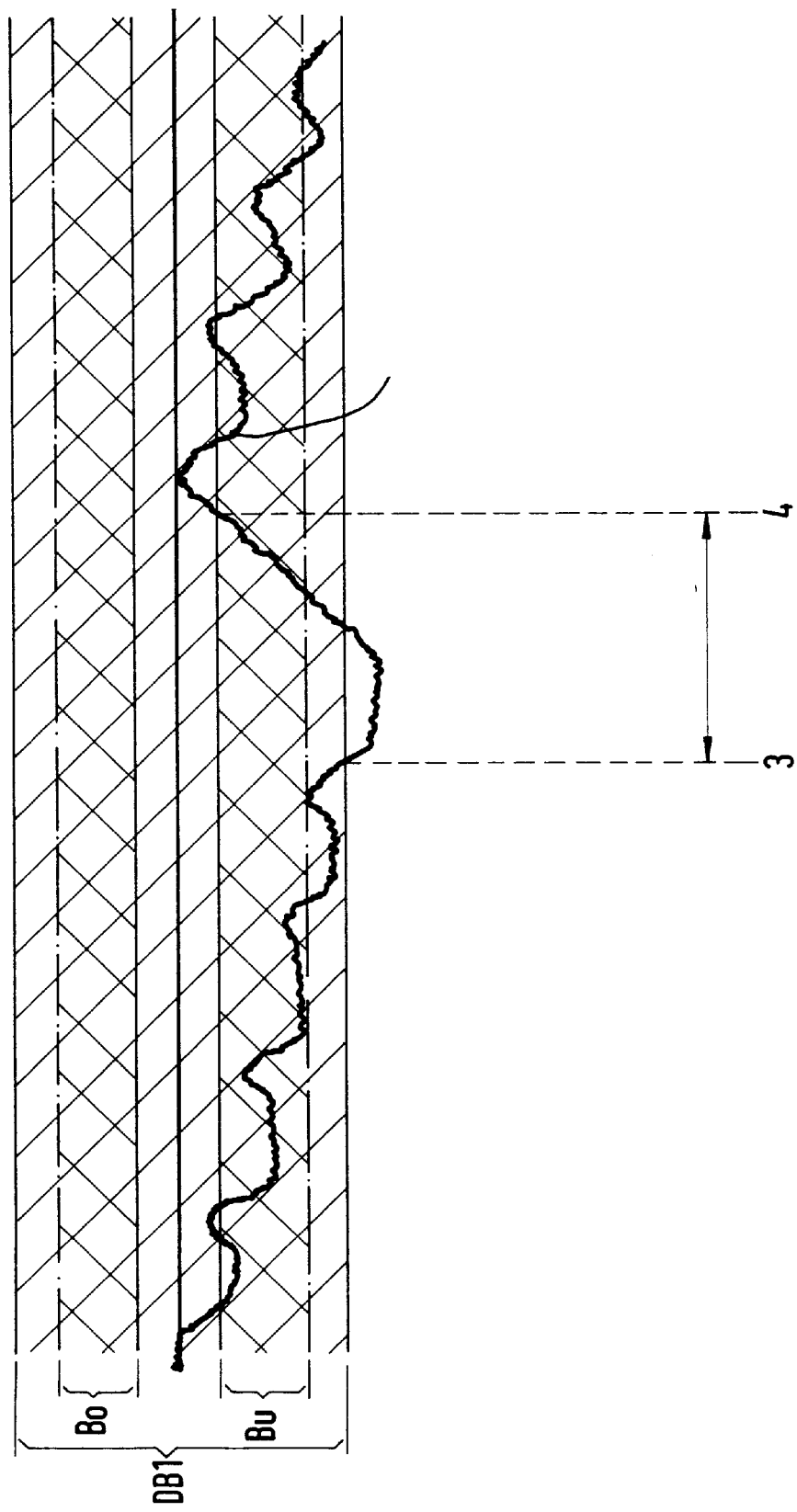

FIG. 3a and 3b show the effect of the measures initiated by the sequence illustrated in FIG. 4.

The same as in FIG. 2 described above, the control dead band DB conditionally initiates a level control only (time 3) when the actual level departs from the control dead band around the set level for a specific time T=T1. As can be seen from the comparison of FIG. 2 (travel operation) with FIG. 3a (loading/unloading operation), the delay time in the loading/unloading operation is chosen longer than in travel operation, the ratio between the time durations T=Tf (travel operation) and T=T1 (loading/unloading operation) illustrated in FIG. 2 and 3 being stated only strictly qualitatively Tf<T1).

The progression illustrated in FIG. 3a is meant to show a level variation during a loading/unloading operation. An industrial truck enters the loading surface of the vehicle with a load at the time 1, which results in a lowering of the actual vehicle level. If the actual level leaves the control dead band DB described above at the time 2', the control is initiated at the time 3, after expiration of the delay time T=T1 which inventionally has been extended as compared to the travel operation. As to the control shutoff dependent on control ratio at the time 4, reference is made again to the initially mentioned article.

Assuming that the delay time T1 has been selected suitably, this means that the industrial truck has, upon placement of the load on the loading surface, left the loading surface again no later than at the time 3, and that the level displacement given at the time 3 and to be settled is attributable solely to the payload. If the delay time were selected shorter (e.g., than that applicable to the travel operation), the industrial truck would after expiration of this shorter control delay time still be on the loading surface; in this case, the level displacement caused by the dead load of the industrial truck would be settled.

The core in this first variant of the invention, hence, is extending the delay time, which during travel operation assumes a value Tf, to the value T1.

In the second variant of the invention, as depicted in FIG. 3b, the control dead band is in the loading and unloading operation widened to the value DB1 (step 405) in relation to the value DBf applicable in the travel operation. The result is that the control operation is being started only at the time 3 shown in FIG. 3b (after the actual level has departed from the band DB1). From the progression of the actual level as sketched in FIG. 3b it follows that the time 3 has been preceded by several loading operations before the marked lowering of the vehicle level below the band DB1 occurs, which for the most is caused by the payload. Here, too, the control is terminated at the time 4 in contingence on the rate of control. As to FIG. 3b it is expressly pointed out that a strictly qualitative progression of the actual level is concerned, for illustrating the invention. Specifically, the control time between 3 and 4 is excessive as compared to the loading cycles indicated by the periodic changes of actual level.

Figure 5:
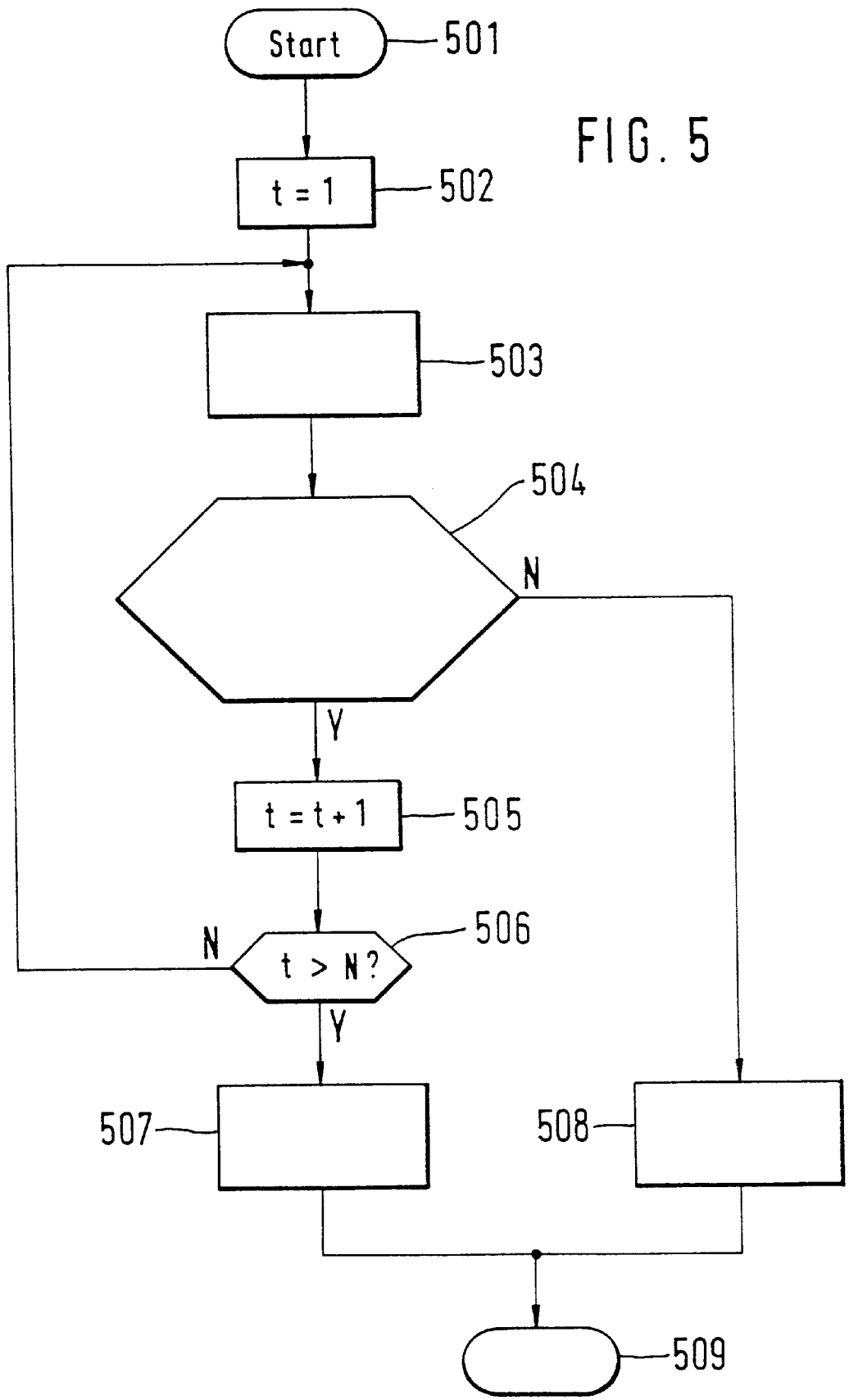

FIG. 3c and FIG. 5 serve to describe the third variant of the invention. Following the start step 501, counter is set to the value t=1 in step 502. In step 503, the current actual level is read, whereafter step 504 queries whether the currently read actual level lies within band B. To that end, the current actual level—as can be seen in FIG. 3c—is compared to an upper and a lower band limit. The upper and lower band limits may be calculated, e.g., from a sliding mean of the actual level of the preceding cycles. If the currently determined actual level lies outside the band B, no level control is initiated in step 508. However, with the current actual level lying within the relatively narrow band B, the counter incremented by 1 in step 505. In step 506, the count is compared to a preset threshold N. If the count is still below the fixed preset threshold N, the routine jumps back to step 503. If the count exceeds the fixed preset value N, the actual level lies during the time span $\Delta T$ within the band B, whereupon the level control commences at step 507. Following end step 509, the program sequence shown in FIG. 5 begins anew.

Here, too, a provision may be that the sequence shown in FIG. 5 be looped through either during the entire operation of the vehicle (travel and loading/unloading operation). Specifically, however, the idea is starting the sequence only in response to an input at the controller (e.g., by an appropriate "loading/unloading operation" input in the remote control 108).

As follows from FIG. 3c, the actual level is tested as to whether or not it has changed markedly during a time $\Delta T$. This verification takes place continually (specifically during the loading/unloading operation). When now it is recognized between times 1 and 2 that the variations of the actual level lie within a band B, the level control to the set value commences at time 2; it ends at the time 4 depending on rate of control.

According to the third variant, a level control is thus carried out only when the actual level varies next to nothing during a time $\Delta T$ (e.g., about 30 seconds). During loading and unloading this is generally the case only when the industrial truck is not present on the loading surface. With the industrial truck present on the loading surface, however, the actual level fluctuates generally about a mean value, attributable to the maneuvering of the industrial truck. Hence, the third variant according to the invention ensures extensively that a level control will take place only when the industrial truck is not present on the loading surface.

In conjunction with the third variant of the invention as illustrated above, a particularly favorable combination of the second and third variants shall be addressed yet at this juncture. In this variant, for one, it is constantly verified whether or not the actual level during a time $\Delta T$ ranges within the band B described above. In addition, however, the control dead band is extended to the value DB1 in accordance with the second variant of the invention. Since with the second variant of the invention alone the enhanced control dead band DB1 is generally being left because the industrial truck enters the loading surface with a load, also the level variation caused by the dead load of the industrial truck is settled in the subsequent control operation. In the proposed combination of the second and third variants, in contrast, control is initiated only after leaving the extended dead band, when the actual level does not vary considerably; that is, when the industrial truck has left the loading surface again.

Figure 6:
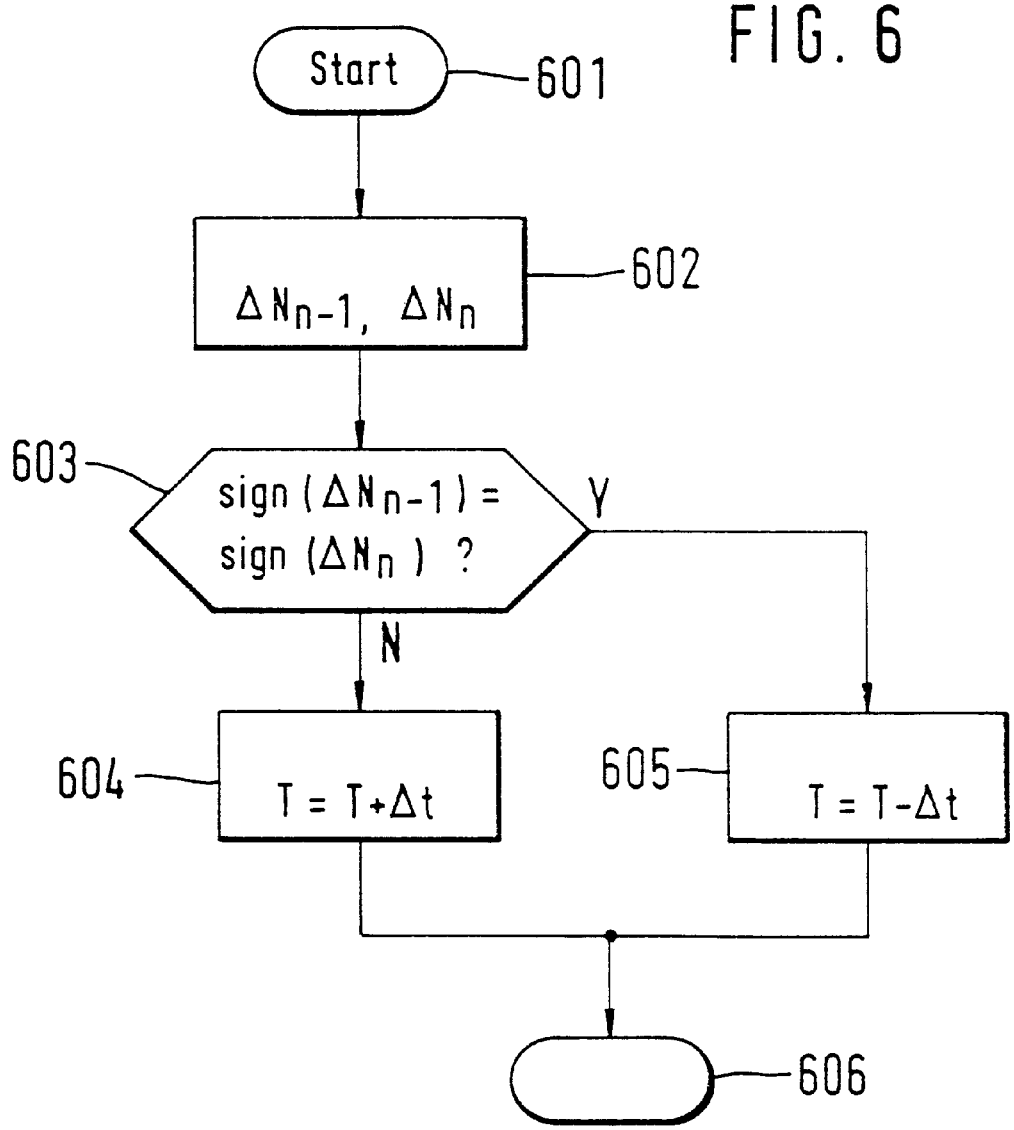

An embodiment of the first inventional variant is illustrated with the aid of FIG. 6. Following the start step 601, the level variations from preceding control cycles are read in step 602. Illustrated in FIG. 6, in exemplary fashion, are the level variations from two control cycles $\Delta N_{n-1}$ and $\Delta N_n$. The mathematical signs of these two level variations are now compared in step 603. If both level variations point in the same direction (raising or lowering the body), the delay time T shown in FIG. 3a is reduced by the value $\Delta t$ in step 605. If step 603 finds that the level variations pointed in different directions, the delay time T relative to FIG. 3a is in step 604 extended by the value $\Delta t$. Following end step 606, the program sequence shown in FIG. 6 starts anew.

Here, too, a provision may be that the sequence shown in FIG. 6 be looped through either during the entire operation of the vehicle (traveling and loading/unloading operation). Specifically, however, the idea is starting the sequence only in response to an input at the controller (e.g., by an appropriate "loading/unloading operation" input in the remote control 108).

By this embodiment of the first variant of the invention one arrives at a self-learning system, or one adapting itself to the loading operations. Allowance is made here for the fact that the loading operations may differ in length of time, depending on loads being handled. If the comparison of level variations of different control cycles (step 603) now finds that these level variations pointed in different directions, it can then be assumed that the dead load of the industrial truck caused these level variations in entering or exiting the loading surface. In this case, the delay time T is extended. If within a preset number of control cycles all of the level variations point in the same direction, the delay time can either be kept constant or, as shown in step 605, can be shortened.

I claim:

1. A system for controlling a vehicle body level to a presettable level, said system comprising means for selectively actuating a time delay before control operations are initiated, means for effecting a state of operation which is adjustable at certain operating conditions of the vehicle, and means for extending said time delay during said adjustable state of operation, whereby control operations during loading and unloading of the vehicle are minimized.

2. System according to claim 1, wherein the adjustable state of operation can be set only with the vehicle at standstill.

3. System according to claim 1 which includes a vehicle switch having a plurality of positions, and wherein the determination of the operating conditions of the vehicle is carried out as a function of the position of the vehicle switch.

4. System according to claim 2, wherein the operating condition of the vehicle is determined by the fact that the vehicle switch is in a position in which the vehicle engine is at standstill and/or the operating condition of the vehicle is determined by the fact that the vehicle switch is not in a position in which the vehicle engine can be started or in which the vehicle engine is or can be in operation.

5. System according to claim 1, including a plurality of actuators for raising and lowering the vehicle body level, a plurality of sensors for detecting the current vehicle body level, and processing means for generating activation signals to activate the actuators.

6. System according to claim 1, wherein the time delay is extended to a value in the range of about 10 to 60 seconds.

7. System according to claim 1, wherein said system operates in control cycles and the determination of the extension of the time delay is a function of the level variation of a preceding control cycle.

8. System according to claim 7, wherein the time delay is extended when level variations with different mathematical signs are sensed within at least two control cycles and wherein the time delay is shortened when level variations with the same mathematical signs are sensed within two control cycles.

9. A system for controlling a vehicle body to a presettable level, said system comprising means having a control dead band around a presettable level, means for effecting a state of operation which is adjustable at certain operating conditions of the vehicle, said operating conditions comprising loading and unloading of the vehicle, and means for extending said control dead band during said adjustable state of operation, whereby control operations during loading and unloading of the vehicle are minimized.

10. A system for controlling a vehicle body to a presettable level as set forth in claim 9, wherein said vehicle includes an engine, a vehicle switch which is determinative of an operating condition of said vehicle wherein the engine of said vehicle is inoperative, said system further comprising means for ensuring that said state of operation is adjusted only when said vehicle switch is determinative that said engine is inoperative.

11. A system for controlling a vehicle body to a presettable level as set forth in claim 9 and further comprising means for controlling said vehicle body only when the vehicle body level varies very little.

12. A system for controlling a vehicle body to a presettable body level as set forth in claim 9 and further comprising a switch which is determinative of an operating condition of the vehicle.

13. A system for controlling a vehicle body to a presettable body level, said system comprising means for selectively actuating a time delay before control operations are initiated, means for controlling said vehicle body in control cycles, means for effecting a state of operation which is adjustable at certain operating conditions of the vehicle, means for extending said time vehicle body level during a preceding control cycle, whereby control operations during loading and unloading of the vehicle are minimized.

14. A system for controlling a vehicle body to a presettable body level, said system comprising means for selectively actuating a time delay before control operations are initiated, means for controlling said vehicle body in control cycles, means for effecting a state of operation which is adjustable at certain operating conditions upon sensing vehicle extending said time delay during said adjustable state of operations upon sensing vehicle body level variations with different mathematical signs within two preceding control cycles and for shortening said selectively adjustable time delay during adjustable state of operations sensing vehicle body level variations with the same mathematical signs within two preceding control cycles, whereby control operations during loading and unloading of the vehicle are minimized.

* * * * *

UNITED STATES PATENT AND TRADEMARK OFFICE
CERTIFICATE OF CORRECTION

PATENT NO.   : 6,061,615
DATED        : May 9, 2000
INVENTOR(S)  : Klaus Karthaeuser Page 1 of 1

It is certified that error appears in the above-identified patent and that said Letters Patent is hereby corrected as shown below:

Claim 13, column 8,
Line 30, after "time" insert -- delay during said adjustable state of operation as a function of the variations of the --

Claim 14, column 8,
Line 40, after "conditions" insert -- of the vehicle, means for extending said time delay during said adjustable state of operations --

Signed and Sealed this

Eleventh Day of September, 2001

*Attest:*

*Attesting Officer*

NICHOLAS P. GODICI
*Acting Director of the United States Patent and Trademark Office*